United States Patent
Amler

(10) Patent No.: US 8,063,612 B2
(45) Date of Patent: Nov. 22, 2011

(54) DIESEL-ELECTRIC DRIVE SYSTEM

(75) Inventor: Gerald Amler, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 463 days.

(21) Appl. No.: 12/374,744

(22) PCT Filed: Aug. 1, 2007

(86) PCT No.: PCT/EP2007/057938
§ 371 (c)(1),
(2), (4) Date: Jan. 22, 2009

(87) PCT Pub. No.: WO2008/017629
PCT Pub. Date: Feb. 14, 2008

(65) Prior Publication Data
US 2010/0013299 A1   Jan. 21, 2010

(30) Foreign Application Priority Data

Aug. 8, 2006 (DE) .......................... 10 2006 037 064
Jan. 22, 2007 (DE) .......................... 10 2007 003 172

(51) Int. Cl.
*B60L 11/08* (2006.01)

(52) U.S. Cl. .......................... 322/46; 290/40 B; 290/40 F

(58) Field of Classification Search ................ 290/40 B, 290/40 F; 322/46
See application file for complete search history.

(56) References Cited

U.S. PATENT DOCUMENTS

| | | | | |
|---|---|---|---|---|
| 4,339,704 A * | 7/1982 | McSparran et al. | ............ | 322/90 |
| 4,456,870 A * | 6/1984 | Rodari | ............................ | 322/29 |
| 4,780,659 A * | 10/1988 | Bansal et al. | .................... | 322/58 |
| 5,099,186 A * | 3/1992 | Rippel et al. | ................... | 318/803 |
| 6,005,786 A * | 12/1999 | Bluemel et al. | .................. | 363/70 |
| 6,049,195 A * | 4/2000 | Geis et al. | ......................... | 322/46 |
| 6,144,190 A * | 11/2000 | Scott et al. | ....................... | 322/25 |
| 6,919,711 B2 * | 7/2005 | Haydock et al. | ................ | 322/24 |
| 7,064,526 B2 * | 6/2006 | Patterson | ......................... | 322/46 |
| 2005/0242758 A1 * | 11/2005 | Edelson | .......................... | 318/376 |
| 2009/0072772 A1 * | 3/2009 | Fuchs et al. | .................... | 318/375 |

FOREIGN PATENT DOCUMENTS

| | | |
|---|---|---|
| DE | 19707763 C1 | 4/1998 |
| DE | 10210164 A1 | 9/2003 |
| EP | 0056393 B1 | 5/1985 |

OTHER PUBLICATIONS

Olaf Körner, Jens Brand, Karsten Rechenberg; Energy Efficient Drive System for a Diesel Electric Shunting Locomotive; EPE 2005, Dresden, Sep. 11-14, 2005; Others; 2005; DE.

* cited by examiner

*Primary Examiner* — Burton Mullins
(74) *Attorney, Agent, or Firm* — Henry M. Feiereisen; Ursula B. Day

(57) ABSTRACT

A diesel-electric drive system having a generator mechanically connected to a diesel motor on the rotor side and linked to a voltage source (intermediate) inverter on the stator side. The voltage source inverter is connected to a self-commuting pulse power converter on the generator and on the load side as well as to a brake resistor. The generator has two multiple-phase coil systems which are each electroconductively linked to a self-commuting pulse power converter on the generator side, wherein the second self-commuting pulse power converter on the generator side is switched electrically parallel to the voltage source (intermediate) circuit of the voltage source (intermediate) inverter on the generator side. At least one input phase of the first self-commuting pulse power converter on the generator side is electroconductively linked via a brake resistor to a input phase of the second self-commuting pulse power converter on the generator side.

11 Claims, 6 Drawing Sheets

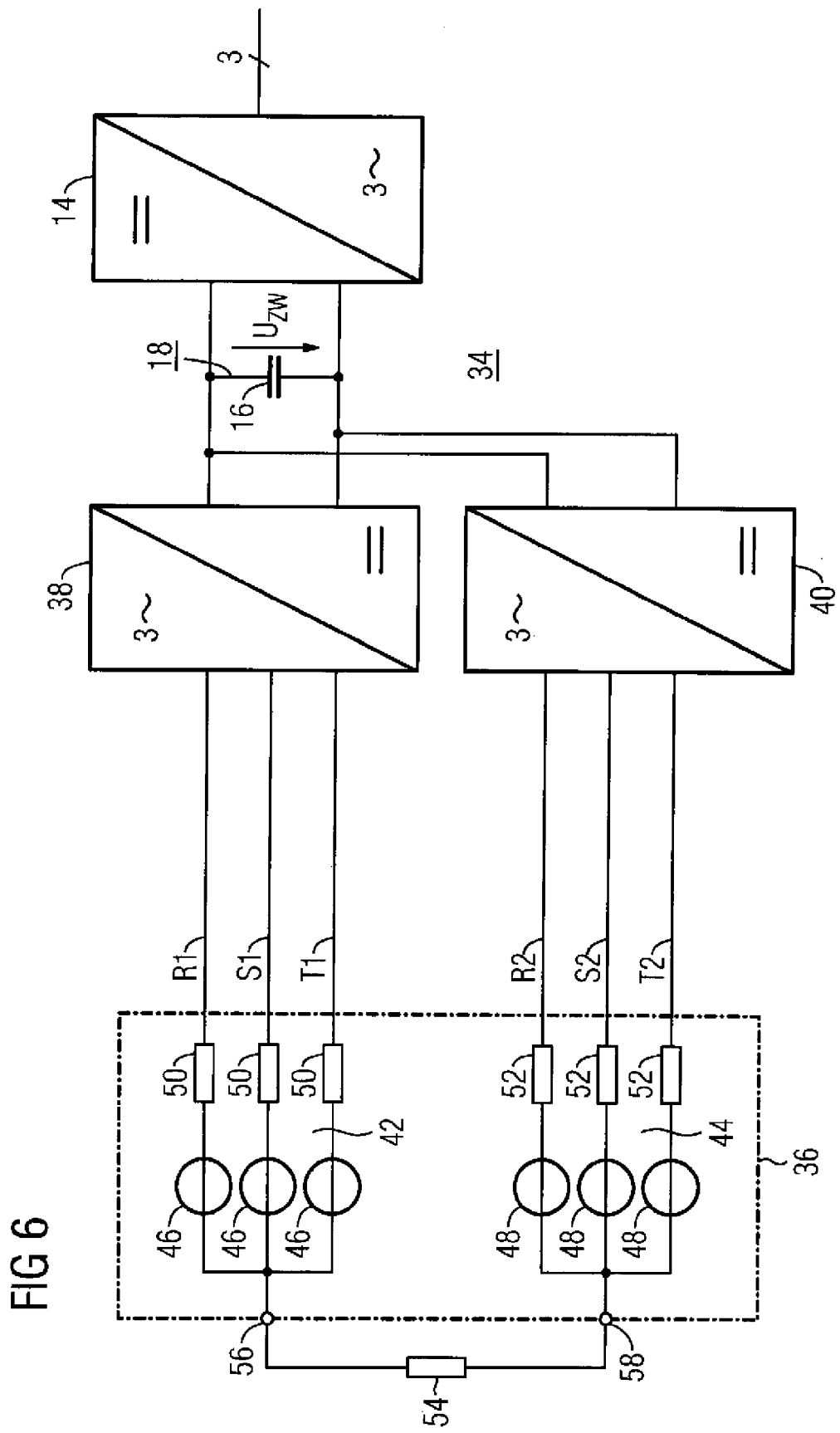

DIESEL-ELECTRIC DRIVE SYSTEM

BACKGROUND OF THE INVENTION

The invention relates to a diesel-electric drive system.

A drive system of this generic type is disclosed in the publication entitled "Energy Efficient Drive System for a Diesel Electric Shunting Locomotive", by Olaf Koerner, Jens Brand and Karsten Rechenberg, printed in the "EPE'2005" Conference Proceedings, of the EPE Conference at Dresden between Sep. 11 and 14 2005. This publication compares two diesel-electric drive systems having a permanent-magnet synchronous generator with one another. These two drive systems differ only in that the generator-side converter of the voltage intermediate-circuit converter is a diode rectifier on the one hand and a self-commutated pulse-controlled converter on the other. The self-commutated pulse-controlled converter is referred to in this publication as an IGBT rectifier. In both drive systems, a braking resistor can be connected to the intermediate circuit of the voltage intermediate-circuit converter. A thyristor which can be turned off is provided for this purpose, and is also referred to as a gate turn-off thyristor (GTO thyristor). By means of this pulse impedance the DC voltage in the intermediate circuit of the voltage intermediate-circuit converter, supplies energy to the intermediate circuit in the braking mode, that is to say the load, in particular a rotating-field machine, thus ensuring that the maximum permissible intermediate-circuit voltage is not exceeded. A portion of this braking power can also be used to compensate for the drag torque of the idling diesel engine. This has the disadvantage that a further converter bridge arm must be used for the braking controller, and the additional rail system for this braking controller must be provided with the intermediate-circuit rail system. Depending on the braking power, it is possible that further converter bridge arms must be used for the braking controller.

In addition, a control apparatus is required for the braking controller.

DE 102 10 164 A1 discloses an apparatus for multiple rectifier feeding of a permanent-magnet synchronous motor in a power station. This permanent-magnet synchronous generator has two polyphase stator winding systems with different numbers of turns. One winding system is connected to a controlled rectifier, for example an IGBT rectifier. The purpose of this controlled rectifier is to regulate the power output and thus the rotation speed of the permanent-magnet synchronous generator. For this purpose, in the range of low rotation speeds, current flows and the electrical power thus flows exclusively via this winding system and thus via the controlled rectifier, which is connected to a DC voltage intermediate circuit. The second winding system is connected to an uncontrolled rectifier, for example a multipulse diode bridge, which is likewise connected to the same DC voltage intermediate circuit as the controlled rectifier. If the phase-to-phase rotation voltage (also referred to as the rotor voltage) is greater than the intermediate-circuit voltage of the DC voltage intermediate circuit, a current can flow in the second winding system and is rectified via the uncontrolled rectifier in the DC voltage intermediate circuit. In this case, because of the magnetic coupling between the first and the second winding system, the amplitude and phase angle of the current in the second winding system can be influenced by the current in the first winding system, which is regulated by the active rectifier (controlled rectifier). This means that the current in the winding system of the uncontrolled rectifier can also be regulated to a certain extent with the aid of the controlled rectifier. The majority of the real power transmitted by this apparatus is carried by the uncontrolled rectifier, thus allowing the controlled rectifier to be designed for a low power, and thus to be cost-effective. With the aid of this controlled rectifier, which is in general also referred to as a self-commutated pulse-controlled converter, heavily over-excited operation of the permanent-magnet synchronous generator is avoided. Furthermore, this compensates for harmonics in the generator torque, which are caused by the uncontrolled rectifier.

In the case of diesel-electric traction drives, for example diesel locomotives or mining trucks, the generator which is fitted to this engine is used to supply energy for the drive. The electrical voltage of the generator is kept at a constant intermediate-circuit voltage by means of the diode rectifier or the IGBT rectifier, from which intermediate-circuit voltage the load-side self-commutated pulse-controlled converter of the drive motors is supplied. During electrical braking, the power flowing in the voltage intermediate-circuit converter is precisely reversed. The energy is supplied through the load-side self-commutated pulse-controlled converter to the voltage intermediate circuit of the voltage intermediate-circuit converter. Since the diesel engine cannot absorb braking power, the braking energy must be converted to heat by means of a braking resistor. A voltage which is pulse-width-modulated by a brake controller is passed to a braking resistor for continuous power control.

This procedure has the disadvantage that, in the braking mode, the rectifier (diode or IGBT rectifier) remains unused, while the braking controller cannot be used in the traction mode. More power semiconductors than are necessary are therefore installed in the converter.

The problem is now to find a solution and a circuit in which the power semiconductors can be used both in the traction mode and in the braking mode without having to reconfigure the topology by means of circuit breakers in this case.

The invention is based on the discovery that, particularly at high power levels, the important factor is not the number of power semiconductors but their installed power or chip area. Particularly at high power levels, the power semiconductors are connected in parallel.

SUMMARY OF THE INVENTION

The invention is now based on the object of improving the diesel-electric drive system of this generic type such that there is no need for an additional braking controller.

According to the invention, this object is achieved by a diesel-electric drive system having a generator which is mechanically coupled on the rotor side to a diesel engine and is mechanically coupled on the stator side to a voltage intermediate-circuit converter with a generator-side and load-side self-commutated pulse-controlled converter and with a braking resistor, wherein a generator with two polyphase winding systems is provided as the generator, which winding systems are respectively electrically conductively connected to a generator-side self-commutated pulse-controlled converter, wherein the second generator-side self-commutated pulse-controlled converter is connected on the DC voltage side electrically in parallel with the voltage intermediate circuit of the voltage intermediate-circuit converter, and in that at least one input phase of the first generator-side, self-commutated pulse-controlled converter is electrically conductively connected by means of a braking resistor to a corresponding input phase of the second generator-side self-commutated pulse-controlled converter.

Since a second generator-side self-commutated pulse-controlled converter is provided, the power of the generator-side self-commutated pulse-controlled converter of a diesel-electric drive system of the type in question is split between these two generator-side self-commutated pulse-controlled converters. This assumes that the generator now has two polyphase winding systems in the stator, instead of one winding system. This results in a further degree of freedom, which can be used for connection of the braking resistors. According to the invention, a braking resistor connects at least one input phase of one generator-side self-commutated pulse-controlled converter to a corresponding input phase of the second generator-side self-commutated pulse-controlled converter of the voltage intermediate-circuit converter.

This further treatment according to the invention of the diesel-electric drive system of this generic type makes it possible to completely dispense with a braking controller in the intermediate circuit of the voltage intermediate-circuit converter. This means that the installed power or the chip area of the voltage intermediate-circuit converter according to the invention has been reduced in comparison to the generic intermediate-circuit converter, with the power output remaining unchanged.

In a further embodiment of the diesel-electric drive system according to the invention, the star points, which are passed out, of the two polyphase winding systems of the generator are electrically conductively connected to one another by means of a braking resistor. This further embodiment has the same advantages over the first embodiment.

If the aim is to achieve a greater braking effect, then each input phase of the first generator-side self-commutated pulse-controlled converter is electrically conductively connected by means of a braking resistor to a corresponding input phase of the second generator-side self-commutated pulse-controlled converter.

In the traction mode, the two generator-side self-commutated pulse-controlled converters of the diesel-electric drive system according to the invention are clocked in phase. In consequence, the difference voltages across the braking resistors are zero, as a result of which no power can be converted in the braking resistors. The circuit therefore acts like a conventional generator system with one winding and one three-phase pulse-controlled converter.

In the braking mode, the two generator-side self-commutated pulse-controlled converters of the diesel-electric drive system according to the invention are controlled such that a voltage zero phase-sequence system is produced. A voltage zero phase-sequence system such as this is produced by shifting either the phase of a clock signal, or a duty ratio. This results in a time shift in the potential of one input phase of one generator-side self-commutated pulse-controlled converter with respect to a corresponding input phase of the other generator-side self-commutated pulse-controlled converter in the converter for the diesel-electric drive system according to the invention. A voltage is therefore dropped across the corresponding braking resistor. The power which is converted in the braking resistors is governed by the time value of the shift. This means that the phase shift or the shift in the duty ratio must assume a predetermined value for a predetermined braking power.

As a result of the phase shift of the clock signals or as a result of the shift in the duty ratio, the mean value of voltage remains the same over one pulse period in corresponding input voltages of the two generator-side self-commutated pulse-controlled converters for the converter for the diesel-electric drive system. The generator current and its torque can therefore still be regulated independently, but at the same time excess energy (braking energy) can be converted to heat by means of the braking resistors, by means of the phase shift or the shift in the duty ratio.

BRIEF DESCRIPTION OF THE DRAWINGS

In order to explain the invention further, reference is made to the drawing, which schematically illustrates one embodiment of a diesel-electric drive system according to the invention, and in which:

FIG. 6 shows an equivalent circuit of a second embodiment of the diesel-electric drive system according to the invention.

DETAILED DESCRIPTION OF PREFERRED EMBODIMENTS

Figure 1:
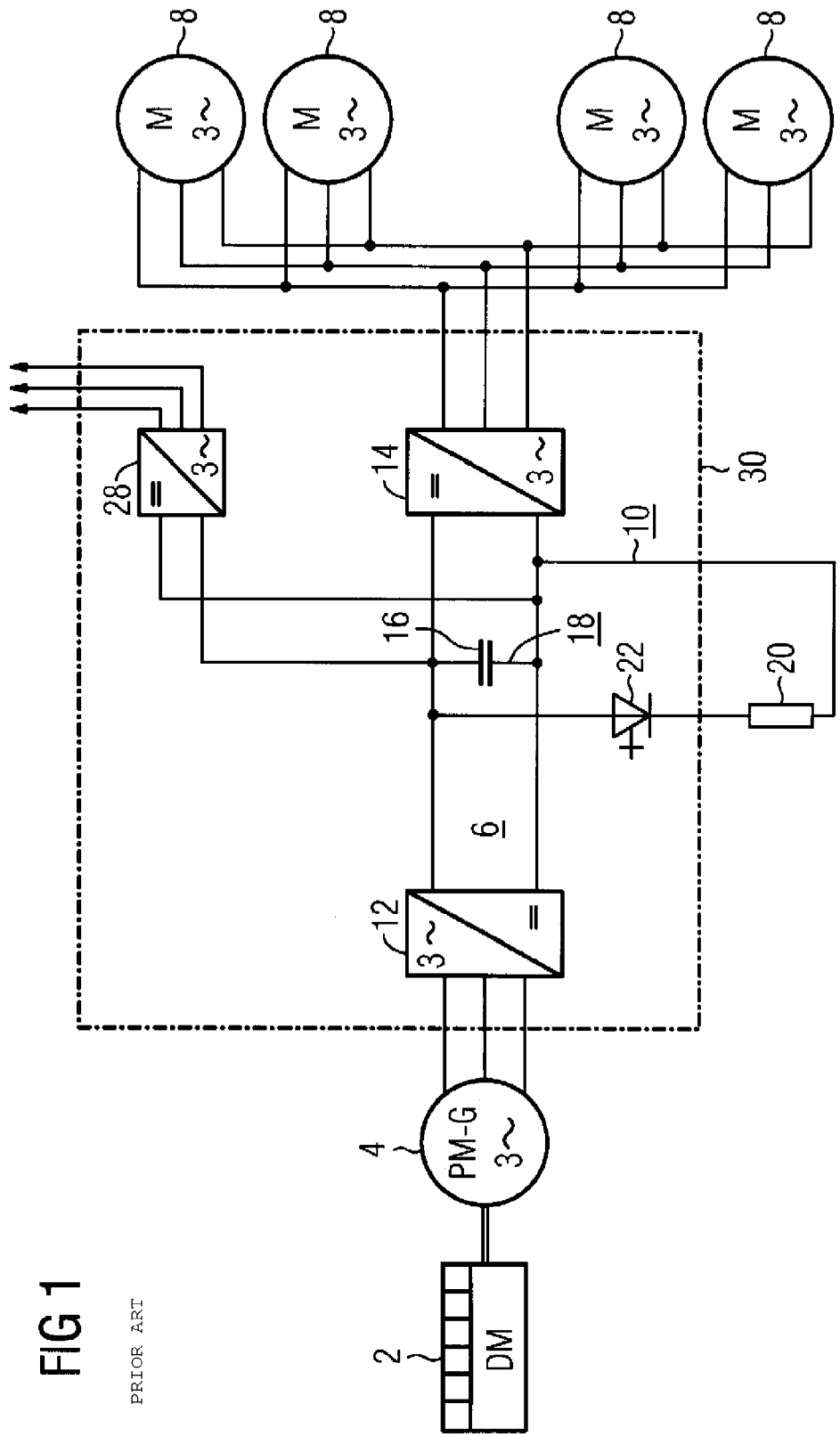
FIG. 1 shows an equivalent circuit of a diesel-electric drive system of this generic type.

In FIG. 1, which illustrates an equivalent circuit of a diesel-electric drive system of this generic type, 2 denotes a diesel engine, 4 a generator, in particular a permanent-magnet synchronous generator, 6 a voltage intermediate-circuit converter, 8 a plurality of rotating-field machines, in particular three-phase asynchronous motors, and 10 denotes a braking chopper. The voltage intermediate-circuit converter has a generator-side and a load-side self-commutated pulse-controlled converter, 12 and 14, respectively, which are electrically conductively connected to one another on the DC voltage side by means of an intermediate circuit 18 which has an intermediate-circuit capacitor bank 16. The braking chopper 10 is connected electrically in parallel with this intermediate circuit 18 and has a braking resistor 20 and a braking controller 22, for example a thyristor which can be turned off, which are electrically connected in series. In addition, the illustration shows an auxiliary operation inverter 28. Auxiliary drives are connected to the AC voltage-side connections of the auxiliary operation inverter 28, although these are not illustrated explicitly here. The diesel engine 2 and the permanent-magnet synchronous generator 4 are mechanically coupled to one another on the rotor side, with the stator side of this permanent-magnet synchronous generator 4 being linked to AC voltage-side connections of the generator-side self-commutated pulse-controlled converter 12 of the voltage intermediate-circuit converter 6.

Since this equivalent circuit is an equivalent circuit of a diesel-electric locomotive, 30 denotes a traction container which accommodates the converter electronics. The braking resistor and the diesel-driven permanent-magnet synchronous generator 4 are arranged outside this traction container 30. The four three-phase asynchronous motors 8 are motors for the two bogeys of a diesel-electric locomotive.

The braking resistor 20 which, in this equivalent circuit, is in the form of one resistor, may also be in the form of resistors connected in series or parallel. The thyristor 22 which can be turned off is a converter bridge arm module in this embodiment, in which only the associated freewheeling diode is used instead of a second thyristor which can be turned off.

Figure 2:
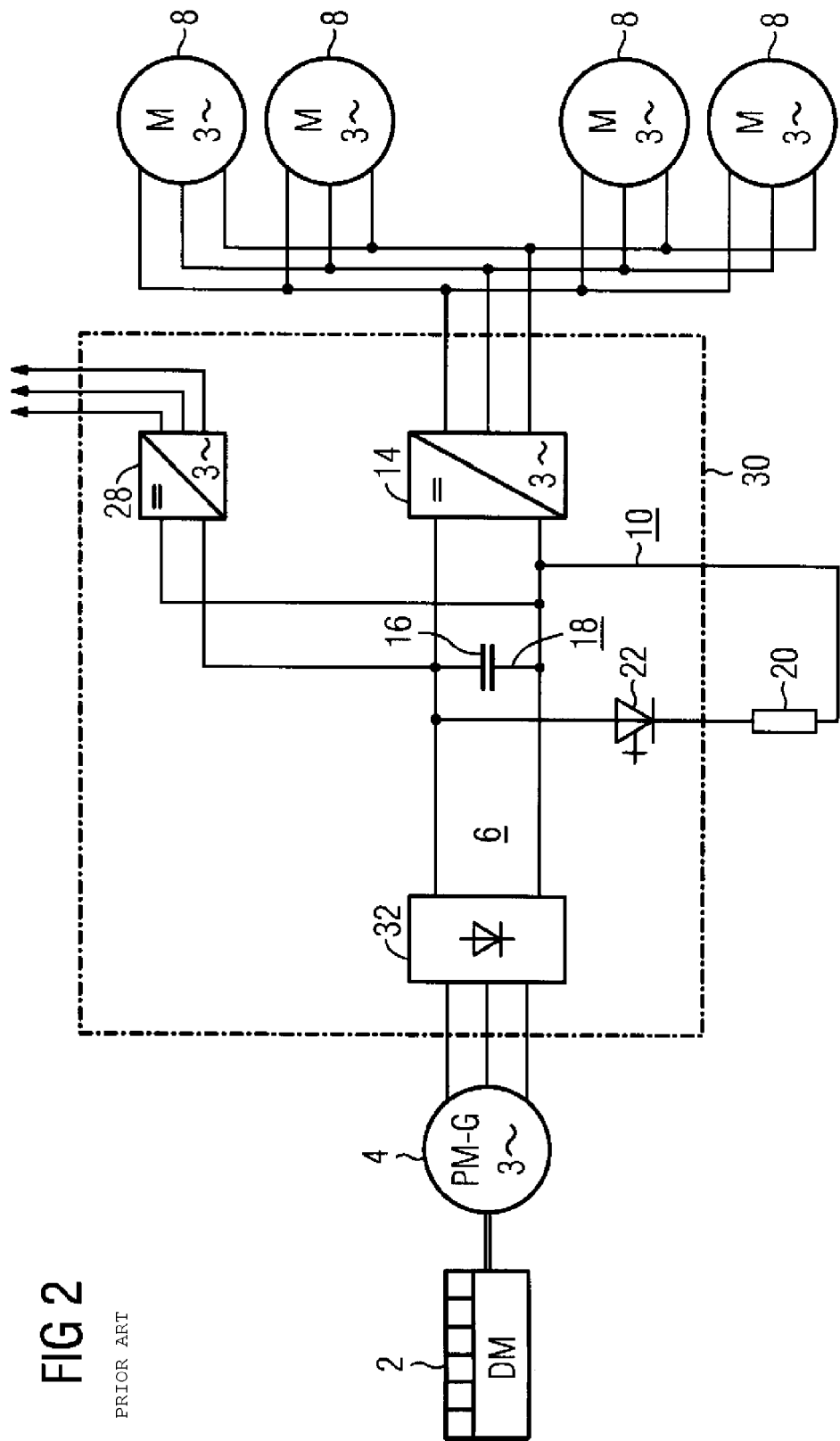
FIG. 2 shows an equivalent circuit of a further known diesel-electric drive system.

FIG. 2 likewise shows an equivalent circuit of a diesel-electric drive system as known from the initially cited publication "EPE'2005", Dresden". This equivalent circuit differs from the equivalent circuit shown in FIG. 1 in that a diode rectifier 32 is provided instead of a generator-side self-commutated pulse-controlled converter 12 which, in this publication, is also referred to as an IGBT rectifier. This circuit of a diesel-electric drive system is less complex than the diesel-electric drive system shown in FIG. 1 since only diodes are required for the generator-side converter. These do not require any drive device in the same way as the power semiconductor switches which can be turned off, in particular insulated gate bipolar transistors (IGBT), of the IGBT rectifier in FIG. 1. In the equivalent circuit in FIGS. 1 and 2, an externally excited synchronous generator or else an asynchronous generator can likewise be used instead of the permanent-magnet synchronous generator 4. In the case of the externally excited synchronous generator, a circuit arrangement for field excitation is additionally required. In addition, when using an asynchronous generator, an additional circuit arrangement is required, by means of which a field can be built up in the asynchronous generator.

Irrespective of these different embodiments of the diesel-electric generator, the voltage intermediate-circuit converter 6 remains the same. This means that a braking chopper 10 is always required in order to allow the rotating-field machines 8 to be electrically braked. The bridge arm of the braking chopper 10, one implementation of the illustrated braking controller 22, is therefore required only when the diesel-electric drive system is in the braking mode. This braking controller is not used in the traction mode.

Figure 3:
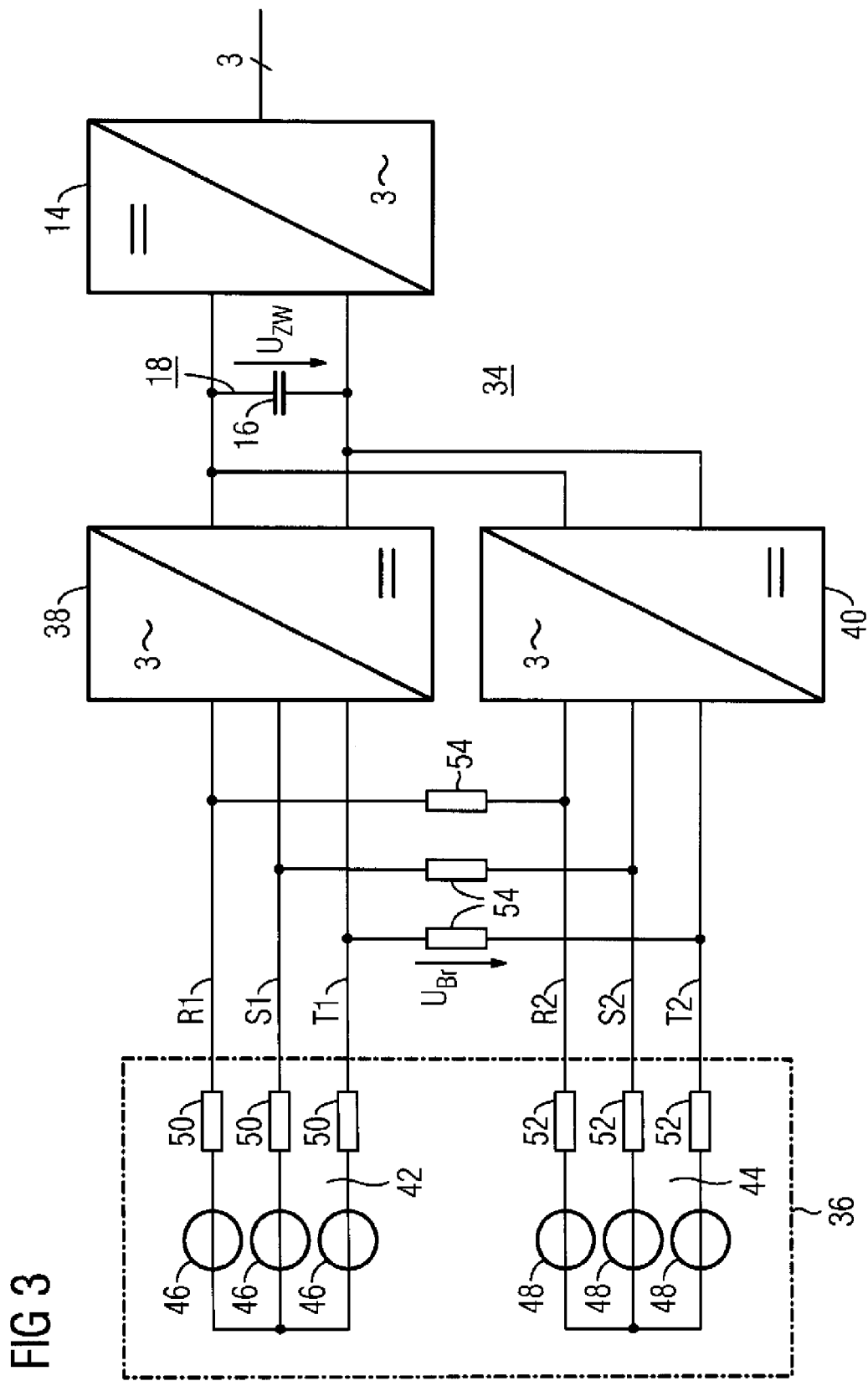
FIG. 3 shows an equivalent circuit of one advantageous embodiment of a first embodiment of a voltage intermediate-circuit converter for a diesel-electric drive system according to the invention.

FIG. 3 schematically illustrates an equivalent circuit of one advantageous embodiment of a first embodiment of a voltage intermediate-circuit converter 34 for a diesel-electric drive system according to the invention. This equivalent circuit likewise illustrates a generator 36 for the diesel-electric drive system, as an equivalent circuit. This voltage intermediate-circuit converter 34 differs from the known voltage intermediate-circuit converter 6 as shown in FIGS. 1 and 2 in that two self-commutated pulse-controlled converters 38 and 40 are provided on the generator side and, on the DC voltage side, are connected electrically in parallel with the intermediate-circuit capacitor bank 16 of the DC voltage intermediate circuit 18. In power terms, these two self-commutated pulse-controlled converters 38 and 40 correspond to the power of the self-commutated pulse-controlled converter 12 for the voltage intermediate-circuit converter 6 shown in FIG. 1. This means that the installed power and therefore the chip area used for the power semiconductor switches of the generator-side converters is unchanged.

On the input side, the generator-side self-commutated pulse-controlled converters 38 and 40, respectively, are electrically conductively connected to a three-phase winding system 42 and 44, respectively, in the generator 36. In the equivalent circuit, a respective voltage source 46 and 48 and respective inductance 50 and 52 are illustrated for each phase of this generator 36, with two three-phase winding systems 42 and 44. Output phases R1, S1, T1 of the first three-phase winding system 42 of the generator 36 are electrically conductively connected to corresponding output phases R2, S2, T2 of the second three-phase winding system 44 of the generator 36 by means of a respective resistor 54, in particular a braking resistor 54.

This circuit of the voltage intermediate-circuit converter 34 now allows various operating modes:

a) Traction Mode:

Since the two three-phase winding systems 42 and 44 of the generator 36 produce the same voltage $U_1$, $U_2$, the generator-side self-commutated pulse-controlled converters 38 and 40 can be clocked in phase. These generator-side self-commutated pulse-controlled converters 38 and 40 have a pulse-width modulator, which is not illustrated explicitly in this FIG., for continuous control of the power. A pulse-width modulator such as this is used to carry out sine-delta modulation, super sine modulation or space-vector modulation. In the case of sine-delta modulation, a set voltage $U^*$, also referred to as a reference sine voltage, is compared with a high-frequency triangular waveform voltage $U_D$. Three pulse-width-modulated phase voltages $U_{R,S,T}$, by way of example, are produced at the output of a modulator such as this. If the two generator-side self-commutated pulse-controlled converters 38 and 40 are clocked in phase in the traction mode, then this corresponds to the two triangular waveform voltages $U_{D1}$ and $U_{D2}$ being coincident. With the voltages $U_{R1,S1,T1}$ and $U_{R2,S2,T2}$, which are the same at all times, at the inputs of the two generator-side self-commutated pulse-controlled converters 38 and 40, a difference voltage $U_{Br}$ in each case remains across a braking resistor 54, equal to zero. No power is therefore lost in these braking resistors 54. The full power produced by the diesel-electric generator 36 is fed without any losses into the intermediate-circuit capacitor bank 16 of the DC voltage intermediate circuit 18 of the voltage intermediate-circuit converter 34 according to the invention b) Braking Mode I:

When the intention is to consume power from the intermediate-circuit capacitor bank 16 of the DC voltage intermediate circuit 18 of the voltage intermediate-circuit converter 34, torque can be built up by means of the generator-side self-commutated pulse-controlled converters 38 and 40 in the generator with two three-phase winding systems 42 and 44. The generator 36 is therefore accelerated. This power can be passed on since the diesel engine can absorb it in the drag mode. This braking mode I is therefore characterized in that energy which is fed back into the intermediate-circuit capacitor bank 16 from the load-side self-commutated pulse-controlled converter 14 is temporarily stored, and is dissipated by diesel-engine braking.

c) Braking Mode II:

If no further consumption in the diesel engine is possible when the braking power becomes greater, the existing braking resistors 54 are used to destroy the energy. In order to allow energy to be converted to heat in each of the resistors 54 a corresponding difference voltage $U_{Br}$ must be dropped across each braking resistor 54. In order to allow such a difference voltage $U_{Br}$ to be produced, the two generator-side self-commutated pulse-controlled converters 38 and 40 are controlled such that a voltage zero phase-sequence system is created. Since the voltages $U_{R1}$, $U_{S1}$, $U_{T1}$, $U_{R2}$, $U_{S2}$ and $U_{T2}$ at the inputs of the two generator-side self-commutated pulse-controlled converters 38 and 40 can be set anywhere between zero and a maximum intermediate-circuit voltage $U_{ZW}$, a difference voltage $U_{Br}$ can also be built up in each case between an input of the generator-side self-commutated pulse-controlled converter 38 and a corresponding input of the generator-side self-commutated pulse-controlled converter 40. The difference voltage $U_{Br}$ produced in this way results in a current flowing through each of the braking resistors 54.

There are various methods for continuous control of the powers converted in the braking resistors 54.

If it is assumed that each of the phases R1, S1, T1, R2, S2 and T2 is driven by means of pulse-width modulation, in particular sine-delta modulation, then this results in a particularly simple embodiment for producing a voltage zero phase-sequence system. Shifting a triangular waveform voltage $U_{D1}$ or $U_{D2}$ of the respective generator-side self-commutated pulse-controlled converter 38 or 40 with respect to the respective triangular waveform voltage $U_{D2}$ or $U_{D1}$ of the generator-side self-commutated pulse-controlled converter 40 or 38 results in the phase voltages $U_{R1}$ and $U_{R2}$, $U_{S1}$, and $U_{S2}$, as well as $U_{T1}$ and $U_{T2}$ being shifted with respect to one another, thus resulting in a difference voltage $U_{Br}$ across the respective braking resistor 54.

Figure 4:
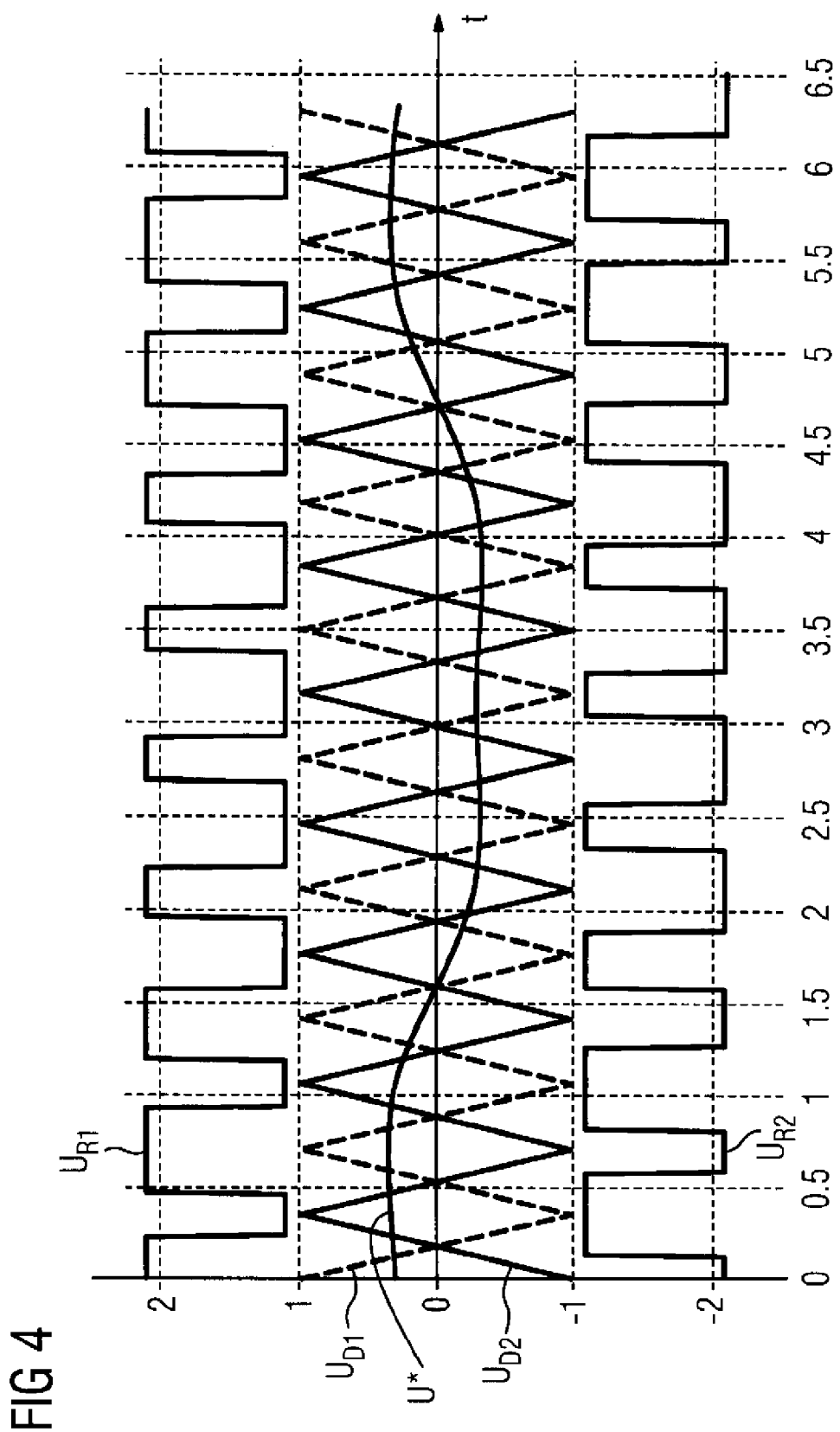
FIG. 4 shows clock signals and input phase voltages of two corresponding phases of the two generator-side self-commutated pulse-controlled converters for the converter shown in FIG. 3, in the form of a diagram plotted against time.

In a diagram plotted against time t, FIG. 4 in each case shows a phase voltage $U_{R1}$ and $U_{R2}$, a triangular waveform voltage $U_{D1}$ and $U_{D2}$ respectively, and a set voltage U*. As can be seen from this diagram, the triangular waveform voltage $U_{D2}$ is electrically phase-shifted through 180° with respect to the triangular waveform voltage $U_{D1}$. The braking power can be adjusted continuously by continuous phase shifting between 0° and 180° electrical or one of these triangular waveform voltages $U_{D1}$ and $U_{D2}$ with respect to the other triangular waveform voltage $U_{D2}$ and $U_{D1}$.

As can also be seen from the diagram in FIG. 4, the mean values of the phase voltages $U_{R1}$ and $U_{R2}$ over one pulse period are the same at any time. This means that the fundamental of the pulse-width-modulated phase voltages $U_{R1}$ and $U_{R2}$ still follows the set voltage U*. The generator current and its torque can therefore still be regulated, in which case excess energy can be converted to heat by means of the braking resistors 54 at the same time, by means of the generation of a voltage zero phase-sequence system.

In addition to the phase shifting of a triangular waveform voltage $U_{D1}$ or $U_{D2}$ with respect to the other respective triangular waveform voltage $U_{D2}$ or $U_{D1}$, a voltage zero phase-sequence system can also be produced by shifting the duty ratio of the pulse-width-modulated phase voltages $U_{R1}$, $U_{S1}$ and $U_{T1}$ of the generator-side self-commutated pulse-controlled converter 38 with respect to the pulse-width-modulated input voltages $U_{R2}$, $U_{S2}$ and $U_{T2}$ of the generator-side self-commutated pulse-controlled converter 40. For this purpose, a DC voltage ΔU which is proportional to the braking power is added to the set voltage U* in one subsystem, while this DC voltage ΔU is subtracted for the other subsystem. A common feature in all cases is that a voltage zero phase-sequence system is generated which, because of the balance conditions of the free star point of the generator, does not excite any current therein in this case.

Figure 5:
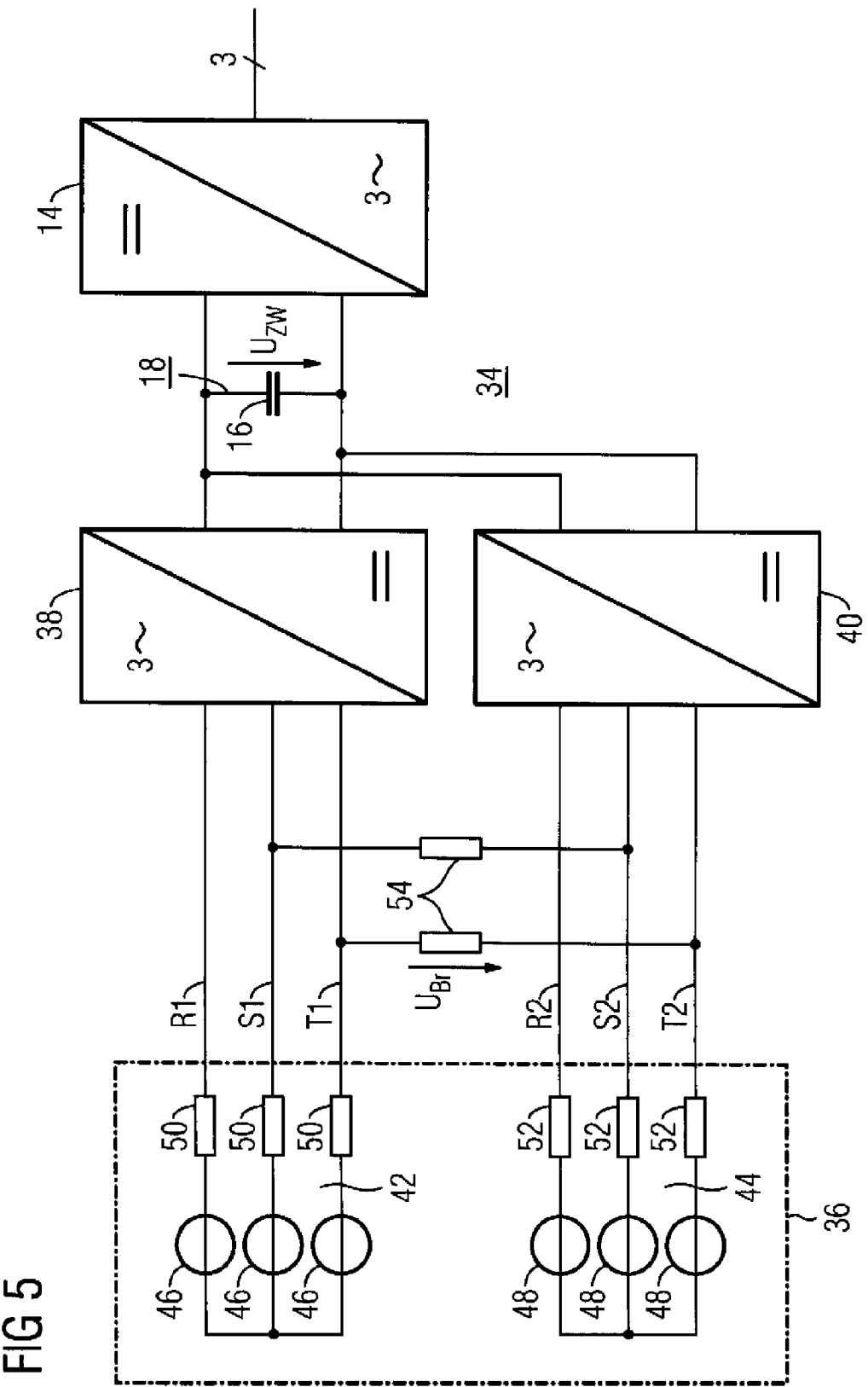
FIG. 5 shows an equivalent circuit of a simplified version of the first embodiment of the diesel-electric drive system according to the invention.

FIG. 5 shows an equivalent circuit of one simple embodiment of the first version of the diesel-electric drive system according to the invention. This simple embodiment differs from the advantageous embodiment shown in FIG. 3 in that only two braking resistors 54 or just one braking resistor 54 are or is used instead of three braking resistors 54. It is irrelevant which input phase R1, S1 or T1 of the first generator-side self-commutated pulse-controlled converter 38 is electrically conductively connected to a corresponding input phase R2, S2 or T2 of the second generator-side self-commutated pulse-controlled converter 40. In the equivalent circuit in this FIG. 5, the input phase T1 is electrically conductively connected to the corresponding input phase T2, and the input phase S1 is electrically conductively connected to the corresponding input phase S2, in each case by means of a braking resistor 54. Since only two braking resistors 54 are used in this simple embodiment of the first version of the diesel-electric drive system, only ⅔ of the braking power available in the embodiment in FIG. 3 can be converted to heat as well. If only one braking resistor 54 is used, then only ⅓ of the available braking power can be converted to heat, in comparison to the embodiment shown in FIG. 3.

If the two polyphase winding systems 42 and 44 of the generator 36 each have a passed-out star point 54 and 56 (FIG. 6), then, instead, one braking resistor 54 can be connected to one input phase R1, S1 or T1, and a corresponding input phase R2, S2 or T2 can be connected to these two star points 54 and 56. This does not change the method of operation of the diesel-electric drive system according to the invention as shown in the embodiment in FIG. 5.

One major feature of the diesel-electric drive system according to the invention is the connection between two three-phase voltage systems by means of braking resistors 54. In comparison to the diesel-electric drive system of this generic type shown in FIG. 1, in the case of the diesel-electric drive system according to the invention, the IGBT rectifier and the braking controller are functionally combined. Where one of the two was in each case unused until now in the traction mode and braking mode, in the case of the diesel-electric drive system according to the invention, both converters can be used at the same time in the traction mode and braking mode. The functional integration of both converters in two generator-side self-commutated pulse-controlled converters 38 and 40 therefore not only halves the number of power semiconductors used, but likewise halves the costs.

The invention claimed is:

1. A diesel-electric drive system having a generator mechanically coupled on the rotor side to a diesel engine and mechanically coupled on the stator side to a voltage intermediate-circuit converter, the voltage intermediate-circuit converter having a voltage intermediate circuit, first and second generator-side self-commutated pulse-controlled converters and at least one load-side self-commutated pulse-controlled converter, the generator-side self-commutated pulse-controlled converters having a DC voltage side and at least one of the generator-side self-commutated pulse-controlled converters having a braking resistor, said drive system further comprising:
   a first polyphase winding system electrically conductively connected to a first generator-side self-commutated pulse-controlled converter having at least one input phase;
   a second polyphase winding system electrically conductively connected to a second generator-side self-commutated pulse-controlled converter and in parallel with the voltage intermediate circuit of the voltage intermediate-circuit converter on the DC voltage side of the second generator-side self-commutated pulse-controlled converter, the second generator-side self-commutated pulse-controlled converter having at least one input phase; and
   a braking resistor electrically conductively connecting at least one input phase of the first generator-side self-commutated pulse-controlled converter to a corresponding input phase of the second generator-side self-commutated pulse-controlled converter.

2. The diesel-electric drive system of claim 1, wherein each input phase of the first generator-side self-commutated pulse-controlled converter is electrically conductively connected by a braking resistor to a corresponding input phase of the second generator-side self-commutated pulse-controlled converter.

3. The diesel-electric drive system of claim 1, wherein the generator is a permanent-magnet synchronous generator.

4. The diesel-electric drive system of claim 1 wherein the generator is an externally excited synchronous generator.

5. The diesel-electric drive system of claim 1 wherein the generator is an asynchronous generator.

6. A diesel-electric drive of claim 1 wherein said first and second polyphase winding systems have passed-out star points and the braking resistor electrically conductively connects the passed-out star points of the first and second polyphase winding systems.

7. A method of operating a diesel-electric drive system in traction mode, the system having a generator mechanically coupled on the rotor side to a diesel engine and mechanically coupled on the stator side to a voltage intermediate-circuit converter, the voltage intermediate-circuit converter having a voltage intermediate circuit and first and second generator-side self-commutated pulse-controlled converters, the first generator-side self-commutated pulse-controlled converter having at least one input phase and being electrically conductively connected to a first polyphase winding system; the second generator-side self-commutated pulse-controlled converter having at least one input phase and a DC voltage side and being electrically conductively connected to a second polyphase winding system and in parallel with the voltage intermediate circuit of the voltage intermediate-circuit converter on the DC voltage side of the second generator-side self-commutated pulse-controlled converter, said second generator-side self-commutated pulse-controlled converter having at least one input phase, a braking resistor electrically conductively connecting an input phase of the first generator-side self-commutated pulse-controlled converter to a corresponding input phase of the second generator-side self-commutated pulse-controlled converter, said method comprising the steps of:
    clocking one of the generator-side self-commutated pulse-controlled converters using a first clock signal; and
    clocking the other of the second generator-side self-commutated pulse-controlled converters using a second clock signal that is in phase with the first clock signal so that a zero-voltage phase-sequence system is produced.

8. A method of braking a diesel-electric drive system, the system having a generator mechanically coupled on the rotor side to a diesel engine and mechanically coupled on the stator side to a voltage intermediate-circuit converter, the voltage intermediate-circuit converter having a voltage intermediate circuit and first and second generator-side self-commutated pulse-controlled converters, the first generator-side self-commutated pulse-controlled converter having at least one input phase and being electrically conductively connected to a first polyphase winding system; the second generator-side self-commutated pulse-controlled converter having at least one input phase and a DC voltage side and being electrically conductively connected to a second polyphase winding system and in parallel with the voltage intermediate circuit of the voltage intermediate-circuit converter on the DC voltage side of the second generator-side self-commutated pulse-controlled converter, said second generator-side self-commutated pulse-controlled converter having at least one input phase, a braking resistor electrically conductively connecting an input phase of the first generator-side self-commutated pulse-controlled converter to a corresponding input phase of the second generator-side self-commutated pulse-controlled converter, said method comprising the steps of:
    clocking one of the generator-side self-commutated pulse-controlled converters using a first clock signal; and
    clocking the other of the generator-side self-commutated pulse-controlled converters using a second clock signal, the second clock signal being phase-shifted relative to the first clock signal.

9. A method of braking a diesel-electric drive system, the system having a generator mechanically coupled on the rotor side to a diesel engine and mechanically coupled on the stator side to a voltage intermediate-circuit converter, the voltage intermediate-circuit converter having a voltage intermediate circuit and first and second generator-side self-commutated pulse-controlled converters, the first generator-side self-commutated pulse-controlled converter having at least one input phase and being electrically conductively connected to a first polyphase winding system; the second generator-side self-commutated pulse-controlled converter having at least one input phase and a DC voltage side and being electrically conductively connected to a second polyphase winding system and in parallel with the voltage intermediate circuit of the voltage intermediate-circuit converter on the DC voltage side of the second generator-side self-commutated pulse-controlled converter, said second generator-side self-commutated pulse-controlled converter having at least one input phase, a braking resistor electrically conductively connecting an input phase of the first generator-side self-commutated pulse-controlled converter to a corresponding input phase of the second generator-side self-commutated pulse-controlled converter, said method comprising the steps of:
    operating one of the generator-side self-commutated pulse-controlled converters using a first duty cycle ratio; and
    operating the other of the generator-side self-commutated pulse-controlled converters using a second duty cycle ratio that is shifted relative to the first duty cycle ratio.

10. The method of braking of claim 8, wherein the first and second clock signals are pulse-width modulated and the pulse-width modulation of one is shifted through a predetermined time with respect to the other for a given braking power.

11. The method of braking of claim 9, wherein the first and second duty ratios of the two generator-side self-commutated pulse-controlled converters are shifted through a predetermined value with respect to one another for a given braking power.

* * * * *